United States Patent
Li et al.

(10) Patent No.: US 11,316,843 B1
(45) Date of Patent: Apr. 26, 2022

(54) SYSTEMS FOR AUTHENTICATING USERS FROM A SEPARATE USER INTERFACE

(71) Applicant: AMAZON TECHNOLOGIES, INC., Seattle, WA (US)

(72) Inventors: Bingxin Li, San Jose, CA (US); Dongbin Li, Pleasanton, CA (US); Aakarsha Agarwal, Santa Clara, CA (US); Smriti Sharma, Sunnyvale, CA (US); Krishna Kiran Gangadharan Nair, Campbell, CA (US)

(*) Notice: Subject to any disclaimer, the term of this patent is extended or adjusted under 35 U.S.C. 154(b) by 14 days.

(21) Appl. No.: 16/835,839

(22) Filed: Mar. 31, 2020

(51) Int. Cl.
| | |
|---|---|
| *G06F 15/16* | (2006.01) |
| *H04L 29/06* | (2006.01) |
| *G06Q 30/00* | (2012.01) |
| *G06Q 20/40* | (2012.01) |
| *G06F 3/0481* | (2022.01) |
| *G06F 16/955* | (2019.01) |
| *G06F 16/958* | (2019.01) |
| *H04L 67/306* | (2022.01) |
| *H04L 67/02* | (2022.01) |
| *G06Q 20/12* | (2012.01) |

(52) U.S. Cl.
CPC ............ *H04L 63/08* (2013.01); *G06F 3/0481* (2013.01); *G06F 16/958* (2019.01); *G06F 16/9566* (2019.01); *G06Q 20/127* (2013.01); *G06Q 20/40* (2013.01); *G06Q 30/0185* (2013.01); *H04L 63/108* (2013.01); *H04L 67/02* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 8,156,246 B2* | 4/2012 | Short | H04L 41/00 709/239 |
| 8,689,099 B1 | 4/2014 | Hanni et al. | |
| 9,037,963 B1 | 5/2015 | Chandi et al. | |
| 9,747,621 B1 | 8/2017 | Kuruvila | |
| 9,779,436 B2 | 10/2017 | Bui | |
| 9,843,576 B1 | 12/2017 | Peng | |
| 10,164,970 B1 | 12/2018 | Peng | |
| 10,311,506 B1* | 6/2019 | Frederick | G06Q 30/0641 |
| 10,366,446 B2 | 7/2019 | Chandi et al. | |
| 2003/0200184 A1* | 10/2003 | Dominguez | G06Q 20/3674 705/78 |
| 2010/0327054 A1* | 12/2010 | Hammad | G06Q 20/12 235/375 |

(Continued)

*Primary Examiner* — Phuoc H Nguyen
(74) *Attorney, Agent, or Firm* — Lindauer Law, PLLC

(57) ABSTRACT

A system facilitates authentication in situations where a pop-up window fails or is disallowed. If a browser application accessing a first webpage is not capable of presenting pop-up windows and redirects a user to a separate webpage for collecting information, the browser application, the absence of a JavaScript object indicating the pop-up window, or the inability to exchange data with a computing device associated with the first webpage is determined. In such a case, if valid information is received from the user, authorization data is provided to the computing device in the form of text included in a Uniform Resource Identifier (URI) for the first webpage. As a result, transactions may be authorized when a browser application is not capable of presenting pop-up windows.

20 Claims, 6 Drawing Sheets

(56) References Cited

U.S. PATENT DOCUMENTS

| | | | |
|---|---|---|---|
| 2011/0282783 A1* | 11/2011 | Ferguson | G06F 16/958 705/40 |
| 2013/0024371 A1* | 1/2013 | Hariramani | G06Q 20/384 705/41 |
| 2014/0289118 A1* | 9/2014 | Kassemi | G06Q 20/3821 705/44 |
| 2015/0332226 A1* | 11/2015 | Wu | G06Q 20/425 705/39 |
| 2017/0300897 A1* | 10/2017 | Ferenczi | G06Q 20/3821 |
| 2018/0183737 A1* | 6/2018 | Subbarayan | G06Q 20/3223 |
| 2018/0308095 A1* | 10/2018 | Hammad | G06F 21/34 |

* cited by examiner

SYSTEMS FOR AUTHENTICATING USERS FROM A SEPARATE USER INTERFACE

BACKGROUND

Certain types of transactions may typically be authenticated using information requested from a user via a pop-up window. Presentation of a pop-up window while a browser application maintains access to a webpage enables a context associated with the acquired information to be determined, and authorization for the transaction, such as a JavaScript token, to be provided to the associated website if the authentication is successful. However, specific browser applications or other types of applications or devices that are unable to present pop-up windows may be unable to authenticate transactions in this manner.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1A:
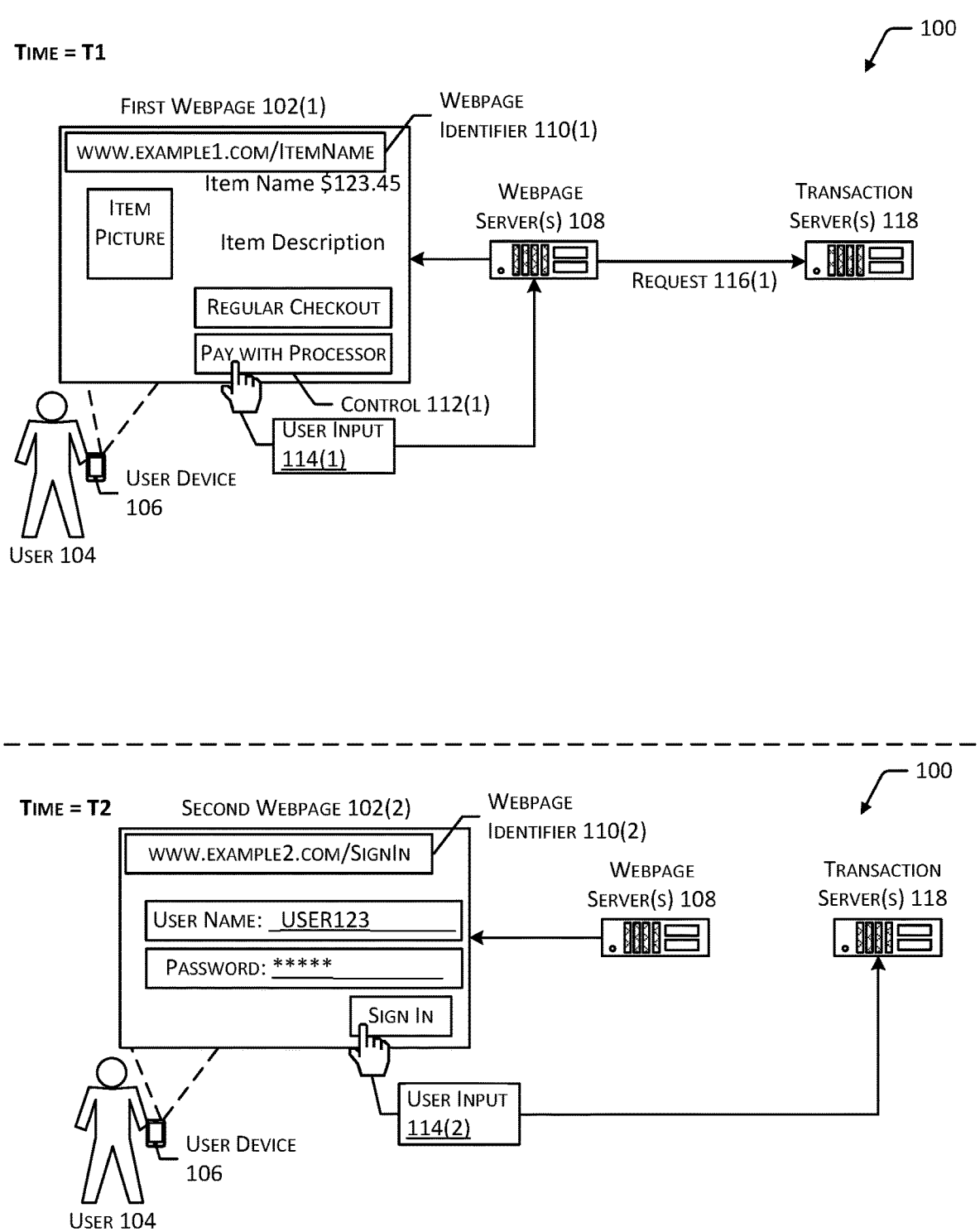
FIGS. 1A and 1B depict an implementation of a system for authenticating access to a transaction associated with a webpage.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Many websites utilize pop-up windows associated with external systems to acquire information from users. Use of a pop-up window that coexists with a webpage for a website (e.g., the pop-up window and webpage may be accessed simultaneously by a browser application) may enable information to be acquired from a user or presented to a user using the pop-up window, while also enabling information to be simultaneously exchanged with the website. For example, a merchant website that offers items for purchase may communicate with a third party payment processor to enable users to complete purchase transactions for items using payments from the payment processor. The merchant website may include a button or other user interface control that may be accessed by a user to initiate a purchase transaction using the payment processor. When the user interface control is selected, a request may be sent to the payment processor system. If the user is currently logged into an account associated with the payment processor or is otherwise authenticated to complete purchase transactions, the purchase transaction may progress using payment information associated with the payment processor account for the user. However, if the user is not currently logged in or authenticated, the user must first provide authentication information to the payment processor system. In such a case, the payment processor system may cause a pop-up window to be presented to the user that requests authentication information, such as an account name and password. The pop-up window may be presented simultaneously with the webpage from the merchant website. Because the browser application is simultaneously accessing both the pop-up window and the merchant website, information received from user input via the pop-up window may be associated with the merchant website (e.g., a context associated with access by the browser application to a webpage of the merchant website may be determined when the pop-up window is presented). Therefore, after the user successfully provides authentication information via the pop-up window, the payment processor may provide an indication of the successful authentication, such as a token or other authentication information via JavaScript, to the merchant website, and the purchase transaction may be continued. For example, after the merchant website receives the token or other indication of a successful authentication from a payment processor system, the user may be presented with widgets or other user interface features associated with selection of payment mechanisms, shipping addresses, and so forth.

However, particular browser applications, such as some browser applications associated with smartphones or other mobile devices, are not capable of presenting a pop-up window simultaneously with a webpage from a website. If a browser is not capable of presenting a pop-up window, then in response to receipt of instructions to present a pop-up window, the browser application may instead redirect the user to a separate webpage, while ceasing access to and presentation of the previous webpage. In such a case, communication with a website upon receipt of authentication information from a user may not be possible due to the browser application no longer accessing the webpage. In other cases, a user may disable or prevent presentation of pop-up windows, such as for security reasons, or a browser that is not capable of presenting a pop-up window may simply fail to present the pop-up window rather than redirecting the user to a separate webpage. In such cases, collection of authentication information from a user may not be possible. If collection of authentication information is not possible, or if an indication of a successful authentication cannot be communicated to a website, a user may be unable to access information or complete a transaction for which authentication by a third party system is required.

Described in this disclosure are techniques for enabling performance of authentication processes, or other types of processes that are intended to be performed using a pop-up window, without requiring presentation of a pop-up window. For example, a website may include a button or other user interface control for accessing a third party system, such as a payment processor. In response to user input selecting the control, the website may provide a request or other type of data to the payment processor system. The request may indicate information regarding a user, user device, or user account, the website that includes the user interface control, a type of transaction or other action, and so forth. For example, a website may present an item available for purchase, and a user may select a button associated with a third party payment processor to use a payment mechanism associated with the user's account for the payment processor to complete a purchase transaction for the item. In response to user selection of the button, a request may be provided to the payment processor system.

The payment processor system may then determine whether authentication information has been received to complete the requested transaction. For example, if a user has already logged into the payment processor system or has provided other authentication information, the transaction may be continued using the payment processor. However, if the user has not yet provided authentication information, a computing device associated with the website may execute instructions, such as JavaScript code provided by the payment processor system, to present a user interface for receiving authentication information from the user. The received authentication information may then be provided to the payment processor system. In some implementations, this user interface may be configured to be presented, using a browser application, as a pop-up window that may coexist simultaneously with a webpage from the website. In such a case, receipt of authentication information using the pop-up window, while the webpage from the website is also being accessed by the browser application, may be used by the payment processor to associate the authentication from the user with the website. In response to the authentication information, the payment processor system may provide an access token or other type of credential to the merchant website, such as by using JavaScript.

However, if the browser application used to access a website is unable to present pop-up windows, presentation of the pop-up window may fail, or information presented in the pop-up window may instead be presented by redirecting the browser application to a separate webpage. In such a case, the context associated with simultaneous access of the browser application to both the pop-up window and the website may be lost.

To enable authentication of a transaction in this case, when a request is received from a website, such as in response to user actuation of a button or other user interface control via a browser application, information associated with the website, such as a Uniform Resource Identifier (URI), may be determined and stored. The user may then be presented with an interface for providing authenticating information as a separate webpage (e.g., a redirection). In some cases, JavaScript or other instructions provided to a computing device associated with the website may be used to present an interface configured to be output as a pop-up window, however the browser application associated with a device used by the user may instead redirect to a separate webpage. In other cases, in response to determining that a browser application is not capable of presenting pop-up windows or that presentation of a pop-up window has failed, the computing device associated with the website may present the interface by redirecting the device used by the user to a separate webpage without attempting use of a pop-up window. When valid authentication information is received, the URI or other website information that was determined and stored may be compared with security data that lists valid URIs or other website information indicative of websites that are authorized to receive authorization data, such as for security purposes. For example, comparing the URI or website information that was determined and stored at the time the request was received with preexisting information indicative of trusted websites may prevent alterations to the stored information. If the stored website information matches the security data, the browser application may redirect to the webpage indicated in the stored URI, and the URI may be appended to include an access token or other type of authorization response, such as additional text in the URI query string. For example, in response to valid authentication information and the stored website information matching the security data, authorization data may be generated that includes the URI for the webpage and text data indicative of an authorization token included within the URI. Upon receipt of the access token or other authorization, the website may present the webpage to the user (e.g., by refreshing or reloading the webpage). The presented webpage may include additional features due to the receipt of the access token or other authorization. For example, a merchant website may include widgets or other user interface features for selection of shipping or payment mechanisms associated with a payment processor. In some implementations, the authorization response may have an expiration time or may indicate one or more authorized transactions or types of transactions. For example, after a merchant website receives an authorization response from a payment processor system, a user may be permitted to perform purchase transactions at the merchant website using the payment processor for a selected period of time, such as one hour, before the user is again required to provide authentication information.

As a result, if a user is accessing a website using a browser application that is unable to present pop-up windows simultaneously with a webpage from the website, the user may be presented with an interface for receiving authentication information as a separate webpage (e.g., a redirection). The initial webpage may then be reloaded after receipt of valid authentication information from the user, and may include additional features in response to receipt of an authorization token. Implementations described herein may therefore enable a user to access information or complete a transaction for which authentication by a third party system is required, even when using browser applications that are unable to present a pop-up window simultaneously with an underlying webpage. Additionally, implementations described herein may be used when a transaction associated with a webpage is authenticated using a separate application. For example, in response to a request to initiate a transaction received via input using a browser application, a user may be presented with an interface using a separate application. In response to receipt of authentication information or other information using the separate application, authorization data may be generated, such as in the form of text included with a URI used by the browser application, that includes additional data to authorize the transaction associated with the webpage.

In some implementations, the process described above may be selectively used based on whether a pop-up window is able to be presented to a user. For example, in response to a request, the browser application or user agent associated with a user device may be compared to browser data that includes a list of browser applications or user agents that are not capable of presenting pop-up windows. If the determined browser application or user agent matches one of the browser applications or user agents on the list, the process described above may be performed, and authentication information may be acquired using an interface presented as a separate webpage instead of a pop-up window. If the determined browser application or user agent does not match one of the browser applications or user agents on the list, a user interface for acquiring authentication information may instead be presented as a pop-up window. In other implementations, a list may instead include browser applications or user agents capable of presenting pop-up windows, a pop-up window may be presented in the case of a matching browser application or user agent, and authentication information may be acquired using an interface presented as a separate webpage if a browser application or user agent that is not included on the list is used.

In other implementations, if it is determined that an attempt to present a pop-up window failed, the process described above may be performed, and authentication information may be acquired using an interface presented as a separate webpage. In some cases, a failure to present a pop-up window may be determine based on an inability to exchange data with the website associated with the webpage. For example, if a browser application redirects a user to a separate webpage for acquisition of authentication information rather than presenting a pop-up window, the browser application may no longer be accessing the webpage associated with the website, and the context associated with the website may not be able to be determined. In such a case, the redirection may be determined based on the inability to exchange data or otherwise determine the context associated with the website. In other cases, a failure to present a pop-up window may be determined directly, or a redirection to a separate webpage may be determined directly. For example, if a pop-up window is successfully presented, a window opener JavaScript object may be created. If this object is not detected or is determined to be undefined, this may indicate that the pop-up window was not presented. In other implementations, use of a pop-up blocker or other code associated with the browser application that may prevent presentation of a pop-up window may be detected, and a separate webpage may be presented for acquisition of authentication information.

As one skilled in the art will appreciate in light of this disclosure, certain embodiments may be capable of achieving certain advantages, including some or all of the following: receiving authentication information by redirecting a user to a separate webpage rather than using a pop-up window may enable access to information and performance of transactions for which authentication by a third party system is required, even in cases where a browser application that is unable to present pop-up windows is used. For example, presentation of a pop-up window concurrently with a webpage may enable data to be exchanged with the website, while use of implementations described herein may enable information regarding a website to be determined and stored, and authorization data to be provided to a website, without requiring use of a browser application capable of such coexistence. Comparison of a URI or other information for a webpage with preexisting information associated with a website may improve security by ensuring that authorization information, such as access tokens included in a URI query, are only sent to the associated website. Multiple methods of detecting the inability to present pop-up windows, such as use of a particular browser application or user agent, the absence of a JavaScript object or other indication of a presented pop-up, the inability to exchange data with an underlying website, or the presence of a pop-up blocker or other code that may prevent use of pop-up windows, may minimize the number of failures to access information or perform transactions that are experienced by a user, improving the user experience and the successful performance of transactions using merchant websites or other types of websites.

Figure 1B:
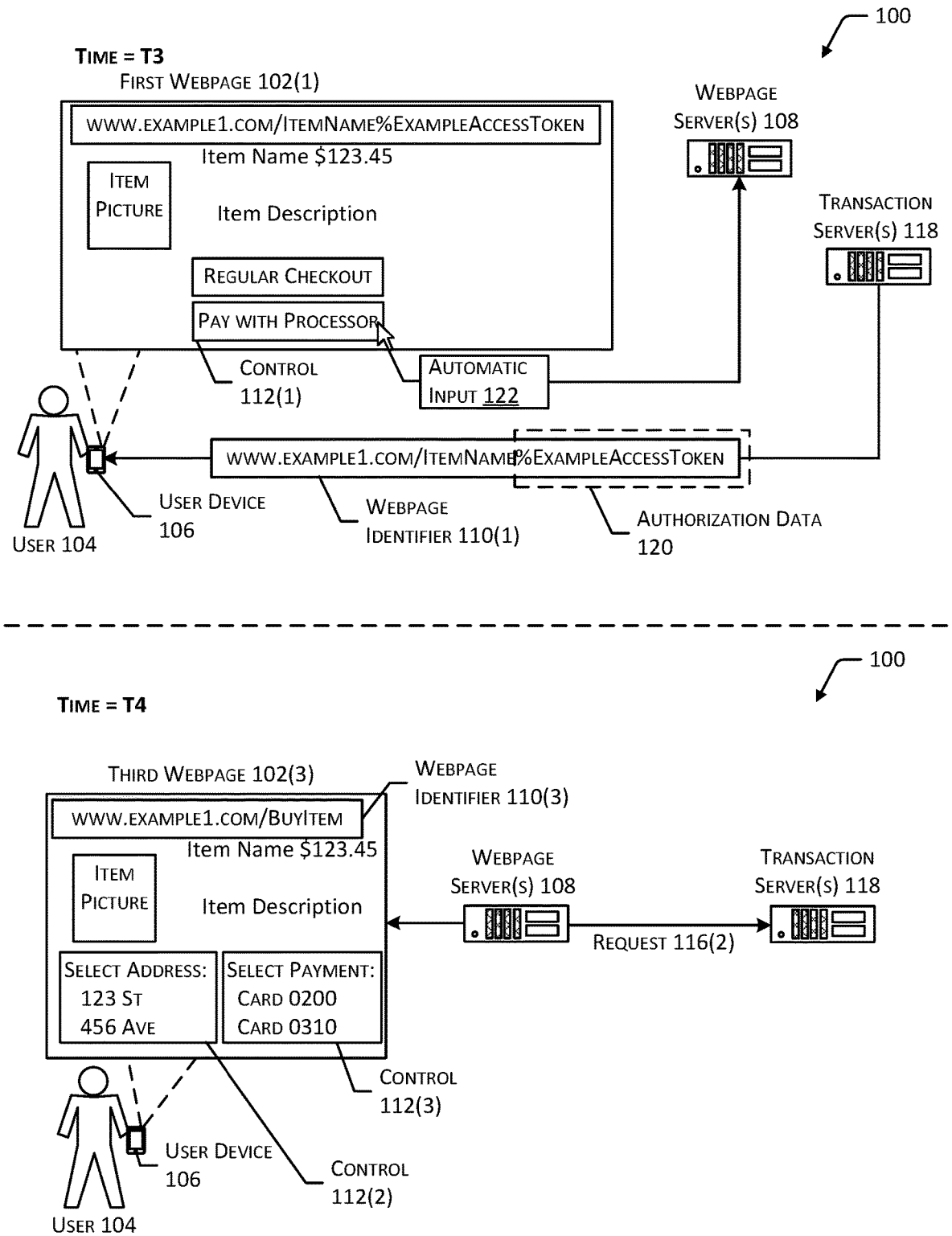

FIGS. 1A and 1B depict an implementation of a system 100 for authenticating access to a transaction associated with a webpage 102. At a first time T1, a user 104 may access a first webpage 102(1) using a user device 106. For example, FIG. 1A depicts one or more webpage servers 108 that may provide data indicative of the first webpage 102(1) to the user device 106 for presentation. The user device 106 and webpage server(s) 108 may include separate computing devices or computing systems. The user device 106 may execute a browser application or another type of application capable of presenting the first webpage 102(1) using data received from the webpage server(s) 108. While FIG. 1A depicts the user device 106 presenting a webpage 102(1) (e.g., a document that includes a markup language, such as Hypertext Transfer Markup Language (HTML)), in other implementations, other types of documents or interfaces may be presented. Additionally, while FIG. 1A depicts the user device 106 as a portable computing device, such as a smartphone, in other implementations, the user device 106 may include any type of computing device including, without limitation, a personal computing device such as a desktop, a portable computing device such as a laptop or tablet computer, a game or media controller, a set top box, or a wearable computing device. Further, while FIG. 1A depicts one or more webpage servers 108 providing data indicative of the first webpage 102(1) to the user device, in other implementations, any number and any type of computing device(s) including, without limitation, the types of computing devices described with regard to the user device 106 may be used to store and transmit data indicative of webpages 102. Additionally, while FIG. 1A depicts the webpage server(s) 108 providing data indicative of the first webpage 102(1), in other implementations, the webpage server(s) 108 may receive the data indicative of the first webpage 102(1) from one or more other servers or other sources prior to providing the data to the user device 106, or the webpage server(s) 108 may provide instructions to other servers or computing devices to cause the other servers or computing devices to provide the data to the user device 106.

FIG. 1A depicts the first webpage 102(1) presenting information associated with the sale of an item. For example, the first webpage 102(1) may be used to initiate a purchase transaction associated with the item. As such, information presented in the first webpage 102(1) may include alphanumeric data, such as an item name, price, or description, image data such as one or more images of an item, and in some implementations, video data, audio data, haptic data, and so forth. In other implementations, other webpages 102 or user interfaces may be used to present other types of information. The first webpage 102(1) may be associated with a webpage identifier 110(1), such as a Uniform Resource Locator (URL) or other type of Uniform Resource Identifier (URI). For example, a browser application may be configured to display the webpage identifier 110(1) in association with other information presented in the first webpage 102(1). The first webpage 102(1) may also include one or more controls 112 that may be used to initiate transactions, request access to information, and so forth. For example, FIG. 1A depicts the first webpage 102(1) including a first control 112(1) that may be used to initiate a purchase transaction for an item presented in the first webpage 102(1)

using a third party payment processor system. Continuing the example, the first control 112(1) may include a button or other type of user interface feature that may be selected or otherwise indicated by user input 114(1) provided to the user device 106.

In response to user input 114(1) provided to the control 112(1), data indicative of the user input 114(1) may be provided to the webpage server(s) 108, which may in turn provide a request 116(1) to one or more transaction servers 118 associated with a transaction represented by the control 112(1). In some implementations, the transaction server(s) 118 may one or more computing devices or computing systems that are separate from the webpage server(s) 108 or user device 106. For example, the transaction server(s) 118 may be associated with a payment processor system that may perform purchase transactions using one or more payment methods or other data acquired from the user 104. The transaction server(s) 118 may include any number and any type of computing device(s) including, without limitation, the types of computing devices described with regard to the user device 106 and webpage server(s) 108. If the user 104 has previously provided authentication information, such as an account name, password, or other information used to authenticate the requested transaction, the transaction server(s) 118 may have previously provided authorization data, such as one or more tokens, to the webpage server(s) 108, and the transaction may be initiated without providing a request 116(1) to the transaction server(s) 118. In other implementations, the transaction server(s) 118 may provide an indication of the previous authentication of the user 104 to the webpage server(s) 108. However, if the user 104 has not previously provided authentication information, the transaction server(s) 118 may provide instructions to cause the user device 106 to present an interface requesting authentication information. For example, prior to the first time T1, the transaction server(s) 118 or another computing device associated with the transaction may provide JavaScript code or other instructions that cause the webpage server(s) 108 to provide the interface to the user device 106. In response to the user input 114(1) or in response to an indication from the transaction server(s) 118 that authentication information has not previously been received, the webpage server(s) 108 may provide the interface. In other implementations, the transaction server(s) 118 may provide the interface to the user device 106 or may provide instructions or data indicative of the interface to the webpage server(s) 108 in response to the request 116(1).

At a second time T2 after the first time T1, the webpage server(s) 108 may provide data indicative of a second webpage 102(2) to the user device 106 to cause presentation of a second webpage 102(2) for requesting authentication information from the user 104. In some implementations, the second webpage 102(2) may be configured for presentation, by a browser application or another application executing on the user device 106, as a pop-up window requesting the authentication information. For example, presentation of a pop-up window by a browser application, concurrent with the first webpage 102(1), may enable the context associated with the access to the first webpage 102(1) by the user device 106 to be determined when authentication information is received via the pop-up window. In such a case, an authorization token or other type of authorization data may be provided to the webpage server(s) 108 directly, such as in the form of a JavaScript token. However, in cases where the browser application of the user device 106 is not configured to present pop-up windows, receipt of such an instruction may instead cause the user device 106 to present the interface requesting authentication information by redirecting the user device to a separate webpage 102(2). If the user device 106 presents the interface as a separate webpage 102(2) without maintaining access to the first webpage 102(1), the context associated with access to the first webpage 102(1) may not be detectable, and the transaction server(s) 118 may be unable to exchange data with the webpage server(s) 108 using the access to the webpage 102(1) by the user device 106.

In some implementations, a failure or inability of the user device 106 to present a pop-up window may be determined prior to causing presentation of the second webpage 102(2), such as by detecting that the browser application associated with the user device 106 is included in a list of browsers that are not configured to present pop-up windows or by detecting that the browser application is associated with instructions for preventing presentation of pop-up windows, such as a pop-up blocker. In such a case, instructions or other data to cause a redirection to the second webpage 102(2) may be provided to the user device 106 without attempting to cause presentation of a pop-up window. In other implementations, a failure or inability to present a pop-up window may be determined by an inability to exchange data with the webpage server(s) 108 due to the absent context associated with access to the first webpage 102(1) by the user device 106. In still other implementations, a failure to present a pop-up window may be detected directly, such as by determining an absence of a JavaScript object indicative of a presented pop-up window. In such cases, an attempt to cause the user device 106 to present a pop-up window may result in the user device 106 instead presenting the second webpage 102(2) and ceasing access to the first webpage 102(1). In other cases, the user device 106 may fail to present a pop-up window without presenting the second webpage 102(2), and instructions or other data to cause presentation of the second webpage 102(2) as a redirection may be provided to the user device 106.

When the inability or failure of the user device 106 to present a pop-up window is determined, the transaction server(s) 118 may determine and store data indicative of the first webpage 102(1), such as the first webpage identifier 110(1). The user device 106 may then present the second webpage 102(2) for receiving authentication information as a redirection. For example, FIG. 1A depicts the second webpage 102(2) associated with a second webpage identifier 110(2) and presenting fields for receiving data from a user 104 for authenticating a transaction, such as a user name and password. The second webpage 102(2) may also include various buttons or other controls 112. User input 114(2) provided to the second webpage 102(2) may include data for authenticating the transaction. Based on the received user input 114(2), the transaction server(s) 118 may authenticate the user 104, such as by determining that the user input 114(2) corresponds to valid authentication information associated with a user account.

As shown in FIG. 1B, at a third time T3 after the second time T2, the transaction server(s) 118 may generate authorization data 120 in response to receipt of valid authentication information via the second webpage 102(2). In some implementations, the authorization data 120 may be generated as text or other data included within the webpage identifier 110(1) for the first webpage 102(1). As such, when the webpage identifier 110(1) and authorization data 120 are provided to the user device 106, the user device 106 may access the first webpage 102(1) that was previously accessed at the first time T1, prior to causing the user device 106 to present the second webpage 102(2). However, due to the inclusion of the authorization data 120 within the webpage identifier 110(1), performance of the transaction associated with the control 112(1) may be authorized. In some implementations, the control 112(1) may be actuated automatically in response to receipt of the authorization data 120, the transaction may be initiated automatically, or the request 116(1) may be automatically sent to the transaction server(s) 118. For example, FIG. 1B depicts automatic input 122 indicative of actuation of the control 112(1) that may be generated and provided to the webpage server(s) 108 in response to the authorization data 120. In other implementations, the user 104 may manually actuate the control 112(1) subsequent to receiving the authorization data 120.

At a fourth time T4 after the third time T3, the user device 106 may present a third webpage 102(3) associated with an authorized actuation of the control 112(1). For example, based on the authorization information 120 received from the transaction server(s) 118, the webpage server(s) 108 may present a third webpage 102(3) associated with continuing the transaction initiated by actuating the control 112(1). Continuing the example, the third webpage 102(3) is shown associated with a third webpage identifier 110(3), and a second control 112(2) and third control 112(3) that may be used to receive user input 114 to indicate parameters of the transaction. In some implementations, the third webpage 102(3) may include a version of the first webpage 102(1) that includes additional features, such as widgets or other controls 112, that are presented based on receipt of authorization data 120 from the transaction server(s) 118. For example, FIG. 1B depicts the second control 112(2) and third control 112(3) including features for selection of shipping addresses and payment methods associated with a purchase transaction. Input provided to the second control 112(2) and third control 112(3) may be communicated to the transaction server(s) 118 as a request 116(2).

Figure 2A:
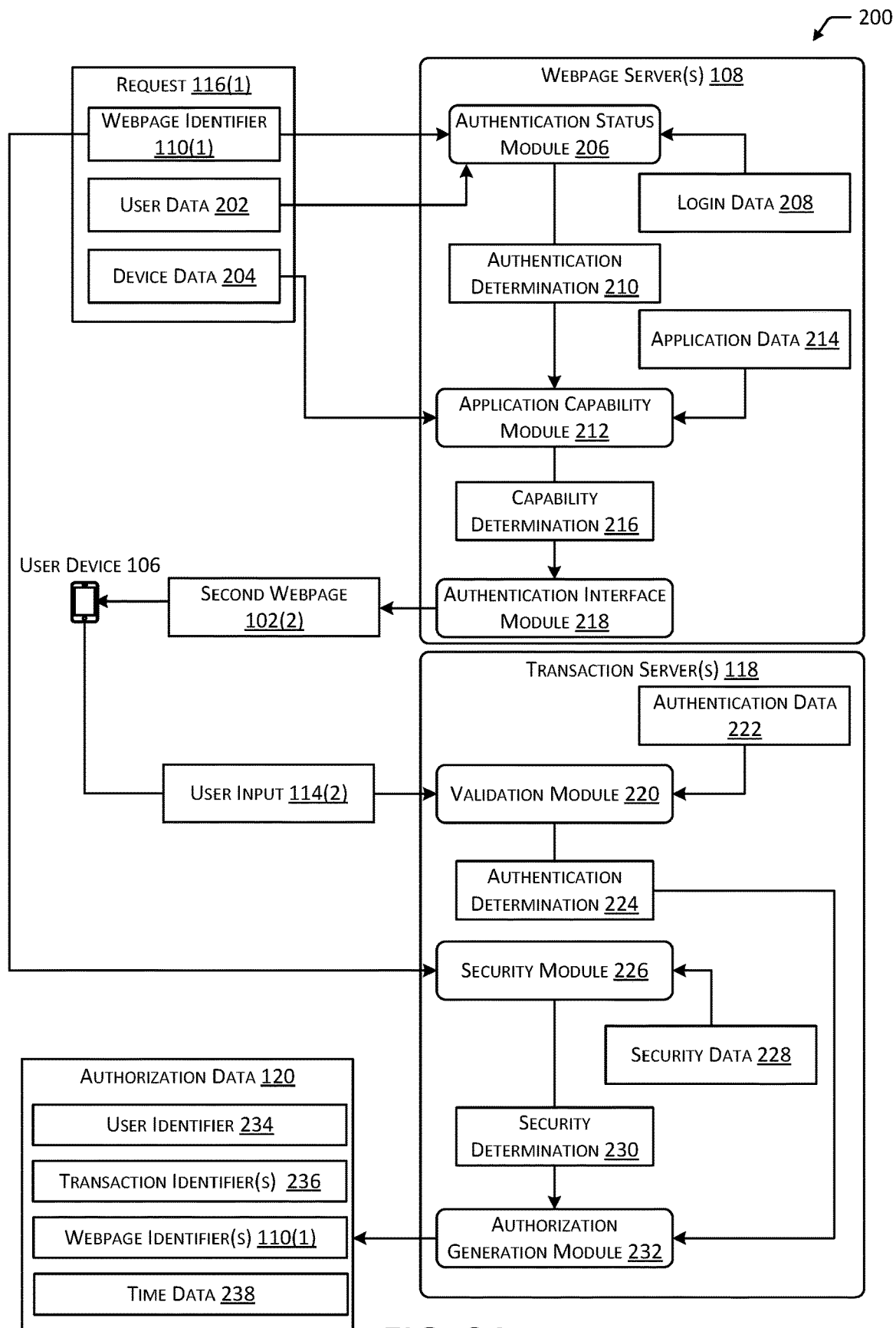
FIG. 2A is a block diagram illustrating an implementation of a webpage server and a transaction server for authenticating access to a transaction.

FIG. 2A is a block diagram 200 illustrating an implementation of a webpage server 108 and a transaction server 118 for authenticating access to a transaction. As described with regard to FIGS. 1A and 1B, the webpage server 108 and transaction server 118 may include separate computing devices associated with separate and distinct computing systems. For example, the webpage server 108 may be associated with a system that provides products or services but may not necessarily include infrastructure for enabling payments or authentication of payment transactions. The transaction server 118 may be associated with a system that provides payment and authentication services and provides a payment gateway for use by users 104 that access the webpage server 108. As described with regard to FIGS. 1A and 1B, one or more transaction servers 118 may receive a request 116(1) in response to user input 114(1) actuating a control 112(1) to initiate a transaction or access information for which authentication is required. For example, the webpage server(s) 108 may receive user input 114(1) indicative of actuation of a control 112(1) or other types of user input and may generate a request 116(1) indicative of the user input 114(1) to the transaction server(s) 118. The request 116(1) may include an indication of the webpage 102(1) from which actuation of the control 112(1) or other user input 114(1) was received, such as the webpage identifier 110(1) for the webpage 102(1). In some implementations, the request 116(1) may also include user data 202 indicative of a user 104, user account, or user device 106 that is accessing the webpage 102(1). In such cases, the user 104 may elect to permit the user data 202 to be acquired or accessed, such as through an opt-in process or another process to provide authorization, consent, or otherwise indicate permission to access the user data 202. The request 116(1) may additionally include device data 204 indicative of one or more characteristics of the user device 106 accessing the webpage 102(1). In some implementations, the device data 204 may include an indication of a browser application or other type of application used to access the webpage 102(1), and in some cases, code or other types of instructions associated with the browser application. For example, instructions associated with a browser application may include code for preventing presentation of a pop-up window. The user 104 may also elect to permit the device data 204 to be acquired through an opt-in process or another type of process to provide authorization, consent, or permission to acquire or access the device data 204.

An authentication status module 206 associated with the one or more of the web server(s) 108 or the transaction server(s) 118 may determine, based on the request 116(1), whether a user 104 is currently authenticated to perform a transaction associated with a webpage 102(1). While FIG. 2A depicts the authentication status module 206 associated with the webpage server(s) 108, in other implementations, the authentication status module 206 may be associated with the transaction server(s) 118. For example, the authentication status module 206 may determine correspondence between the request 116(1) and login data 208 that indicates user accounts or other user data 202 that are currently authenticated to perform transactions, and webpage identifiers 110 or other webpage information indicative of the webpages 102 for which associated transactions may be performed. If the login data 208 corresponds to the request 116(1), this may indicate that the user 104 has previously been authenticated and the transaction may be authorized. In some cases, the request 116(1) may include an indication of one or more tokens or other types of authorization data 120, which may be used to determine that the transaction has been authorized. However, if the login data 208 does not correspond to the request 116(1), this may indicate that authentication information for the transaction has not been received. The authentication status module 206 may generate an authentication determination 210 indicative of the correspondence or lack of correspondence between the login data 208 and the request 116(1). In other implementations, previous receipt of authorization data 120 by the webpage server(s) 108 may be used to generate the authentication determination 210. For example, receipt of a URI or other webpage identifier 110(1) associated with authorization data 120 may be used to determine that a transaction has been authorized, while the absence of authorization data 120 may indicate that authentication information for the transaction has not been received.

An application capability module 212 associated with the webpage server(s) 108 may determine whether a browser application or other type of application associated with the user device 106 accessing the webpage 102(1) is capable of presenting a pop-up window for receiving authentication information. For example, as described previously, the webpage server(s) 108 may receive JavaScript code or other types of instructions from the transaction server(s) 118, or another source. The instructions received by the webpage server(s) 108 may configure the webpage server(s) 108 to determine whether an application executed by a user device 106 is capable of presenting pop-up windows. In some implementations, the application capability module 212 may determine correspondence between an application accessing the webpage 102(1), indicated in the device data 204, and application data 214 that includes a list of applications that are not capable of presenting pop-up windows. In other implementations, the application capability module 212 may determine a lack of correspondence between the application accessing the webpage 102(1) and application data 214 that includes a list of applications that are capable of presenting pop-up windows. In still other implementations, the application capability module 212 may determine the presence of code or other instructions associated with the application accessing the webpage 102(1) that restrict or present presentation of pop-up windows, such as a pop-up blocker. The application capability module 212 may generate a capability determination 216 indicative of whether the application used to access the webpage 102(1) is capable of presenting pop-up windows. As described above, consent from the user 104 may be obtained that permits acquisition of or access to the device data 204 or other data associated with the user 104, user device 106, or applications associated with the user device 106.

If the capability determination 216 indicates that the application is capable of presenting pop-up windows, an authentication interface module 218 may provide instructions or other data to cause the user device 106 to present an interface for receiving authentication information as a pop-up window. However, if the capability determination 216 indicates that the application is not capable of presenting pop-up windows, the authentication interface module 218 may cause the user interface to be presented as a redirection to a separate webpage 102(2), such as by causing a browser application or another application accessing the first webpage 102(1) to cease accessing the first webpage 102(1) and begin accessing the separate webpage 102(2).

In other implementations, the authentication interface module 218 may first provide instructions or other data to cause the user device 106 to present an interface for requesting authentication information as a pop-up window, and the application capability module 212 may then determine whether the pop-up window was successfully presented, whether a failure to present the interface occurred, or whether the instructions to present the pop-up window caused the application accessing the webpage 102(1) to instead present the interface as a separate webpage 102(2). For example, the application capability module 212 may determine occurrence of a redirection to a separate webpage 102(2), a lack of access between the application and the first webpage 102(1), an absence of a JavaScript object indicating a presented pop-up window, and so forth. In such a case, the application capability module 212 may generate the capability determination 216 after determining the outcome of the instructions to cause the user device 106 to present the pop-up window.

A validation module 220 associated with the transaction server(s) 118 may receive user input 114(2) containing authentication information provided to the separate webpage 102(2), or to a pop-up window in cases where an application executed by the user device 106 is capable of presenting pop-up windows. The validation module 220 may determine correspondence between the authentication information and authentication data 222 indicative of valid authentication information. In cases, where a lack of correspondence between the user input 114 and authentication data 222 is determined, the validation module 220 may generate a notification, alarm, or other type of output indicative of invalid authentication information and prevent access to features of the webpage 102(1) that require authentication for access. In cases where the authentication data 222 corresponds to the received authentication information, authorization data 120 may be generated to cause access to the features of the webpage 102(1). For example, the validation module 220 may generate an authentication determination 224 indicative of whether valid authentication information was received via the second webpage 102(2).

In cases where an interface requesting authentication information is presented by redirecting an application executing on the user device 106 to a second webpage 102(2) rather than as a pop-up window, access between an application associated with the user device 106 and the first webpage 102(1) may cease, and the context associated with this access may not be determined. In such a case, a security module 226 associated with the transaction server(s) 118 may determine and store a URI, other webpage identifier 110(1), or other webpage information based on the request 116(1). The security module 226 may determine correspondence between the webpage identifier 110(1) or other webpage information and security data 228 that includes a list of URIs or other webpage information indicative of sources that are authorized to receive the authorization data 120. For example, if a malicious party were to alter the URI indicated in the request 116(1) to attempt to cause authorization data 120 or other sensitive information to be provided to a website other than the website associated with the first webpage 102(1), a mismatch between the webpage identifier 110 of the request 116(1) and the security data 228 may prevent sensitive information from being provided to other destinations. If the security data 228 corresponds to the webpage identifier 110(1) indicated in the request 116(1), authorization data 120 may be generated to permit access to features of the webpage 102(1) for which authorization is required. The security module 226 may generate a security determination 230 indicative of whether the URI, other webpage identifier 110(1), or other webpage information determined from the request 116(1) matches or is within a threshold similarity to the security data 228. For example, in some cases, webpage identifiers 110(1) that do not directly match the security data 228 but are associated with the same website may result in a security determination 230 indicating a valid webpage identifier 110(1), while in other cases, a system may be configured to require a URI that matches the security data 228.

An authorization generation module 232 associated with the transaction server(s) 118 may generate authorization data 120 in response to receiving an authentication determination 224 indicative of receipt of valid authentication information, and in response to a security determination 230 indicative of a webpage identifier 110(1) or other webpage information in the request 116(1) corresponding to the security data 228. The authorization data 120 may be provided to a computing device associated with the webpage 102(1) to indicate authorization to perform a transaction associated with the request 116(1). As described with regard to FIGS. 1A and 1B, the authorization data 120 may be included in a webpage identifier 110(1) or other webpage information, such as part of a URI that is transmitted to the user device 106 or website associated with the webpage 102(1) to cause the webpage 102(1) to be presented with one or more additional features associated with performance of the transaction.

In some implementations, the authorization data 120 may include a user identifier 234 indicative of a particular user 104, user account, or user device 106 for which performance of the requested transaction is authorized. The authorization data 120 may include one or more transaction identifiers 236 indicative of particular transactions for which performance has been authorized. For example, a webpage 102 may include controls 112 for requesting multiple transactions, and a single authentication process may be used to authorize performance of multiple transactions. In other cases, an authentication process may authorize only a single transaction or a subset of transactions when multiple transactions are presented in a webpage 102. In some implementations, the authorization data 120 may include one or more webpage identifiers 110(1). For example, transactions associated with particular webpages 102 within a website may be authorized, but transactions associated with other webpages 102 may not be authorized using the same authorization data 120. The authorization data 120 may also include time data 238 indicative of an expiration time associated with the authorization data 120. For example, the time data 238 may include a timestamp indicative of a time at which the authorization data 120 is no longer usable to authorize transactions. In other cases, the time data 238 may include a timestamp indicative of a time that the authorization data 120 was generated, and one or more rules associated with the system may indicate a length of time past the time that the authorization data 120 is generated before the authorization data 120 is no longer usable. In other cases, the authorization data 120 may include an indication of a length of time until the authorization data 120 is no longer usable.

Figure 2B:
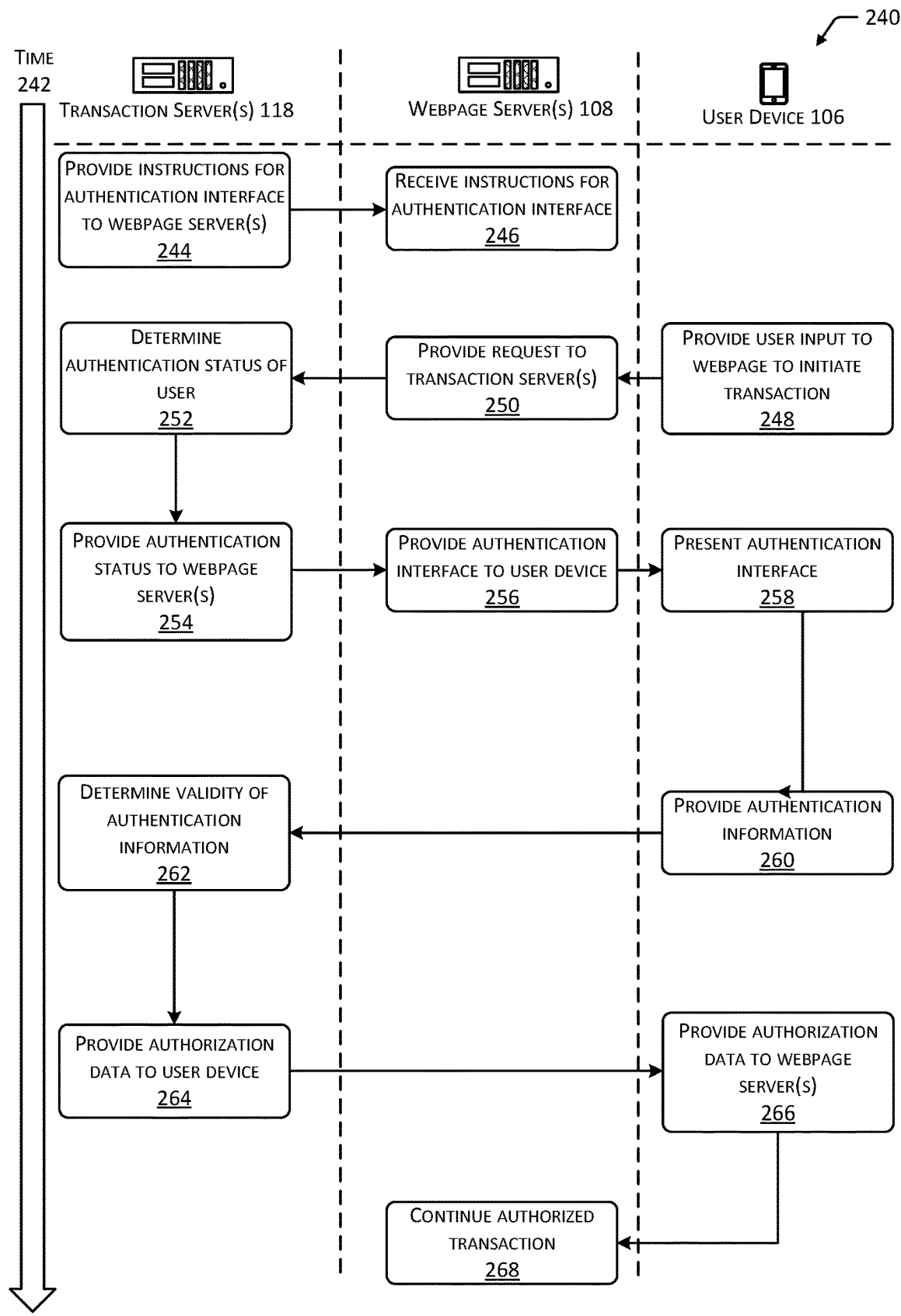
FIG. 2B is a flow diagram illustrating interactions between the user device, webpage server(s), and transaction server(s).

FIG. 2B is a flow diagram 240 illustrating interactions between the user device 106, webpage server(s) 108, and transaction server(s) 118. As described previously, the user device 106, webpage server(s) 108, and transaction server(s) 118 may include separate computing devices or be associated with separate computing systems. For example, the webpage server(s) 108 may be associated with a merchant website offering goods or services for purchase. The user device 106 may be a computing device owned by a consumer seeking to purchase a good or service using the merchant website. The transaction server(s) 118 may be associated with a payment processor that provides a payment gateway and authenticates payment transactions for users 104 of the merchant website. The passage of time is illustrated by the vertical arrow 242, with time progressing from the top of the page toward the bottom.

At 244, the transaction server(s) 118 may provide instructions for presentation of an authentication interface to the webpage server(s) 108. For example, the instructions may include JavaScript code or other types of computer-executable instructions that may cause the webpage server(s) 108 to provide one or more interfaces to a user device 106 in response to certain conditions. Continuing the example, the instructions may cause the webpage server(s) 108 to provide an interface requesting authentication information to a user device 106 in response to a request to initiate a transaction and a determination that previous authentication for the transaction has not been received. The instructions may also cause the webpage server(s) 108 to provide the received authentication information to the transaction server(s) 118 for validation. At 246, the webpage server(s) 108 may receive the instructions from the transaction server(s) 118 and begin executing the instructions or prepare the instructions for use.

At a subsequent time, a user device 106 may access a webpage 102(1) associated with the webpage server(s) 108. For example, the user device 106 may use a browser application to provide a request to access a particular webpage 102(1) associated with a URI that is input or selected by a user 104. The webpage server(s) 108 may provide data indicative of the webpage 102(1) to the user device 106 for presentation. At 248, the user device 106 may provide user input 114(1) to the webpage 102(1). For example, the user input 114(1) may include actuation of a control 112(1) or other feature of the webpage 102(1) to request performance of a transaction. At 250, in response to the user input 114(1), the webpage server(s) 108 may provide a request 116(1) indicative of the transaction to the transaction server(s) 118. As described with regard to FIG. 2A, the request 116(1) may include data indicative of one or more of the webpage 102(1), user device 106, user 104, or a user account. Permission from the user 104 may be obtained to allow acquisition of or access to information regarding the user device 106, user 104, or user account. At 252, the transaction server(s) 118 may determine an authentication status of the user 104, such as by determining correspondence between user data 202 determined from the request 116(1) and login data 208 indicative of authentication information that has been previously received. At 254, the transaction server(s) 118 may provide an indication of the authentication status to the webpage server(s) 108. In other implementations, the webpage server(s) 108 may determine the authentication status of the user 104, such as by determining that authorization data 120 indicative of the transaction, user 104, and webpage 102(1) has been previously received.

At 256, in response to a determination that the user 104, user device 106, or user account has not previously been authenticated to perform the transaction, the webpage server(s) 108 may provide an authentication interface to the user device 106. For example, the webpage server(s) 108 may execute the instructions received from the transaction server(s) 118 to cause generation of the interface. At 258, the user device 106 may present the authentication interface. In some implementations, the authentication interface may be configured for presentation as a pop-up window by a browser application executing on the user device 106. However, in some cases, the browser application may instead cause the interface to be presented by redirecting to a separate webpage 102(2). In other implementations, in response to a determination that the user device 106 or an application executing on the user device 106 is not capable of presenting the interface as a pop-up window, or a determination that presentation of a pop-up window did not occur, the authentication interface may instead be provided to the user device 106 for presentation by redirection to a separate webpage 102(2).

At 260, the user device 106 may provide authentication information using the authentication interface. In some implementations, data indicative of the authentication information may be provided from the user device 106 to the transaction server(s) 118. In other implementations, the data indicative of the authentication information may be provided to the webpage server(s) 108 which may provide at least a portion of the data to the transaction server(s) 118. At 262, the transaction server(s) 118 may determine validity of the authentication information. For example, as described with regard to FIG. 2A, the received authentication information may be compared to authentication data 222 indicative of valid information, such as account names, passwords, and so forth.

At 264, in response to receipt of valid authentication information, the transaction server(s) 118 may generate and provide authorization data 120 to the user device 106. As described with regard to FIGS. 1A, 1B, and 2A, in some implementations, the authorization data 120 may include text within a URI or another type of webpage identifier 110(1) associated with the webpage 102(1). The authorization data 120 may then be used by the user device 106 to access the webpage 102(1) and indicate authorization of the transaction. For example, at 266, the user device 106 may provide the authorization data 120 to the webpage server(s) 108. At 268, the webpage server(s) 108 may continue the transaction. In some implementations, continuation of the transaction may include automatically presenting controls 112 or other features associated with the transaction, automatically directing the user device 106 to a webpage 102 for continuation of the transaction, automatically resubmitting a request 116 to initiate the transaction to the transaction server(s) 118 which may then provide an indication that the transaction has been authorized, and so forth.

Figure 3:
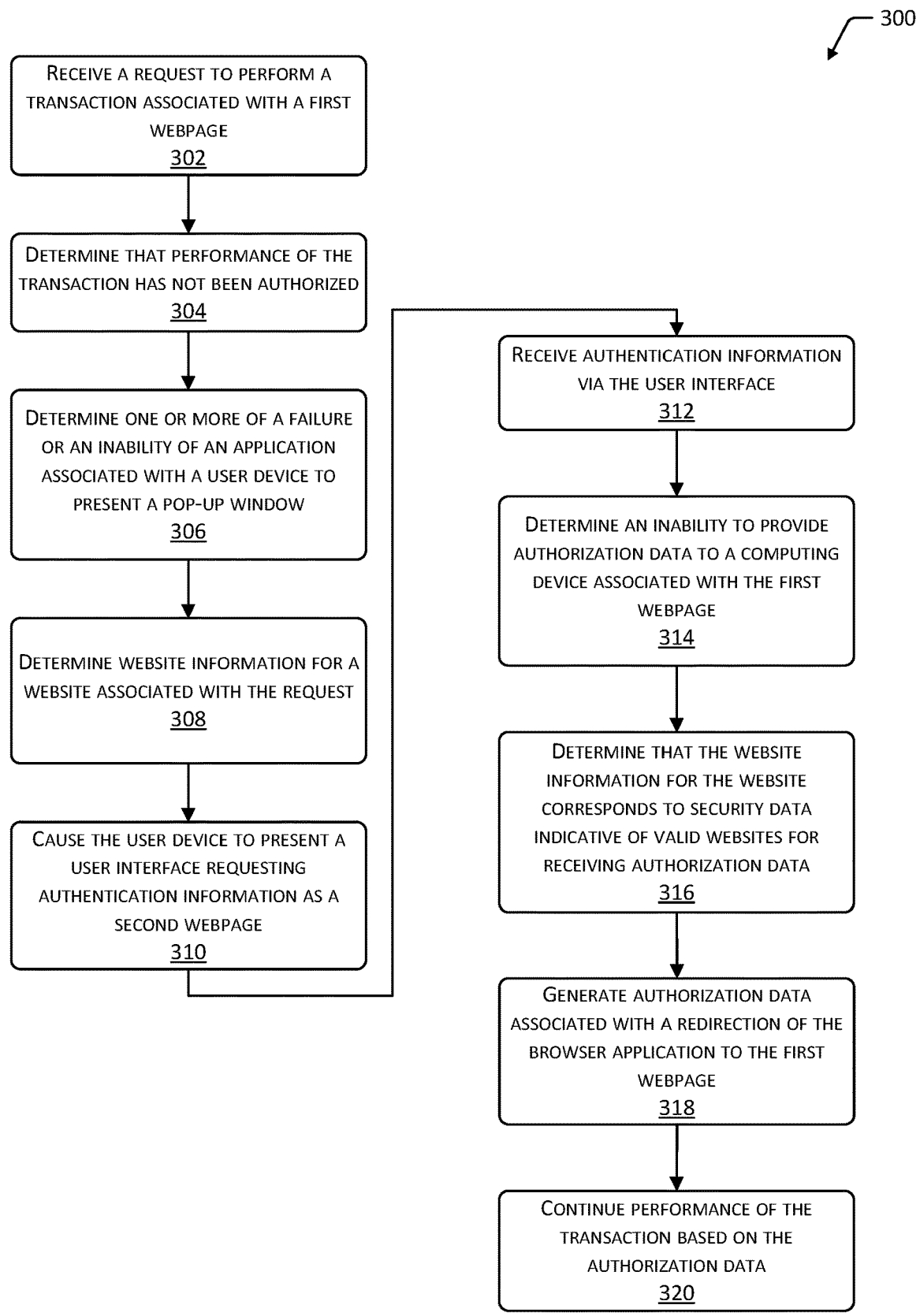
FIG. 3 is a flow diagram illustrating an implementation of a method for authenticating access to a transaction associated with a webpage.

FIG. 3 is a flow diagram 300 illustrating an implementation of a method for authenticating access to a transaction associated with a webpage 102(1). At 302, a request 116(1) to perform a transaction associated with a first webpage 102(1) may be received. A request 116(1) may be generated in response to user input 114(1) actuating a control 112(1) or other types of input. For example, in response to actuation of a control 112(1) presented in a webpage 102(1), a webpage server 108 associated with the webpage 102(1) may generate a request 116(1) to be provided to one or more transaction server(s) 118. In other implementations, a request 116(1) may be provided by a user device 106 or another computing device in communication with the webpage server(s) 108. As described with regard to FIG. 2A, a request 116(1) may include data indicative of the webpage 102(1), data indicative of a user device 106, user 104, or user account, and so forth.

At 304, a determination may be made that performance of the transaction has not been authorized. For example, if a user 104 has previously provided authentication information, the transaction server(s) 118 may provide an indication of the previous authentication and performance of the transaction may continue without performing the steps shown in FIG. 3. As another example, if authorization data 120 authorizing the transaction has previously been received, the webpage server(s) 108 may determine that the transaction is authorized based on the authorization data 120 and the transaction may be continued based on this determination.

At 306, one or more of a failure or inability of an application associated with a user device 106 to present a pop-up window is determined. As described with regard to FIG. 2A, an inability of an application, such as a browser application, to present a pop-up window may be determined based on correspondence between the application and application data 214. In other cases, an inability of an application to present a pop-up window may be determined based on the absence of a JavaScript object or other instructions indicative of a presented pop-up window, the inability to detect the context associated with access by the application to the initial webpage 102(1), or redirection of the application to access a second webpage 102(2). For example, in some cases, an instruction may be provided to an application to cause presentation of a pop-up window, but the application may instead present the information from the pop-up window as a redirection to a separate webpage 102(2). In such a case, the fact that a pop-up window was not presented may be determined even if an application is capable of presenting pop-up windows, and even in cases where communication between the application and the first webpage 102(1) is maintained.

At 308, website information for a website associated with the request 116(1) may be determined. Website information may include a webpage identifier 110(1) for the webpage 102(1), or other information indicative of the webpage 102(1) or the website with which the webpage 102(1) is associated.

At 310, a user interface requesting authentication information may be presented using the user device 106 as a redirection to a second webpage 102(2). For example, the browser application or other application associated with the user device 106 may be configured to redirect to a separate webpage 102(2) in response to instructions to present a pop-up window. In other implementations, in response to determining that the application is not capable of presenting a pop-up window, instructions to present the user interface as a redirection to a separate webpage 102(2) may be provided to the user device 106.

At 312, authentication information may be received via the user interface. For example, user input 114(2) to a webpage 102(2) presenting the user interface may be received, such as a user name or account name and a password, or other types of information that may be used to authenticate a user 104, user account, or user device 106. As described with regard to FIG. 2A, correspondence between the received information and authentication data 222 may be used to determine whether the received information validly authenticates a user 104, account, or user device 106.

At 314, an inability to provide authorization data 120 to a computing device associated with the first webpage 102(1) may be determined. For example, an application associated with a user device 106 may at times present an interface for receiving authentication information without presenting a pop-up window even though the application is capable of maintaining communication with the first webpage 102(1). In such a case, the absence of a pop-up window may be determined even though it may be possible to transmit a JavaScript token or other type of authorization data 120 to the computing device associated with the first webpage 102(1) due to the access to the webpage 102(1) by the application. However, if an inability to provide authorization data to the computing device associated with the first webpage 102(1) is determined, the method may proceed to blocks 316, 318, and 320.

At 316, in response to valid authentication information received via the user interface and an inability to provide authorization data 120 to the computing device associated with the first webpage 102(1), a determination may be made that the website information for the website corresponds to security data 228 indicative of valid websites for receiving authorization data 120. As described previously, to prevent malicious or erroneous transmission of authorization data 120 to computing devices that are not authorized to receive information regarding the user 104, user device 106, user account, website, transaction, and so forth, the webpage identifier 110(1) or other information determined from the request 116(1) may be compared to a list of valid webpage identifiers 110 or other information. For example, at least a portion of the security data 228 may be received from a computing device associated with a website. The received security data 228 may include a list of URIs or other webpage information indicative of valid webpages 102 associated with the website. Subsequently, when authorization data 120 is generated and included with a URI, the security data 228 may be used to verify that the URI included with the authorization data 120 is associated with a webpage 102 of the website. In some implementations, the authorization data 120 may only be sent if the security data 228 matches the URI included with the authorization data 120. In other implementations the authorization data 120 may be sent in response to correspondence between the URI and security data 228 having at least a threshold level of similarity.

At 318, authorization data 120 associated with a redirection of the application to the first webpage 102(1) may be generated. For example, as described with regard to FIG. 1B, authorization data 120 may be included within a URI or other information indicative of the first webpage 102(1). As such, the authorization data 120 and URI may be used by the user device 106 to cause the browser application, or other application accessing the second webpage 102(2), to navigate to the first webpage 102(1). Inclusion of the authorization data 120 with the URI or other webpage information may indicate that the transaction is authorized, which may result in the first webpage 102(1) including one or more additional features associated with the transaction. As such, at 320, performance of the transaction may be continued based on the authorization data 120. In some implementations, receipt of the authorization data 120 and URI may cause automatic input 122 actuating a control 112(1) or a request 116(2) to perform a transaction to be automatically resubmitted. For example, a user 104 may provide user input 114(1) selecting a control 112(1) on a first webpage 102(1), which may cause a second webpage 102(2) requesting authentication information to be presented. After redirection of a browser application to the first webpage 102(1) in response to the URI and authorization data 120, input indicative of selection of the control 112(1) may automatically be resubmitted to the webpage sever(s) 108 without requiring user input 114(1).

Figure 4:
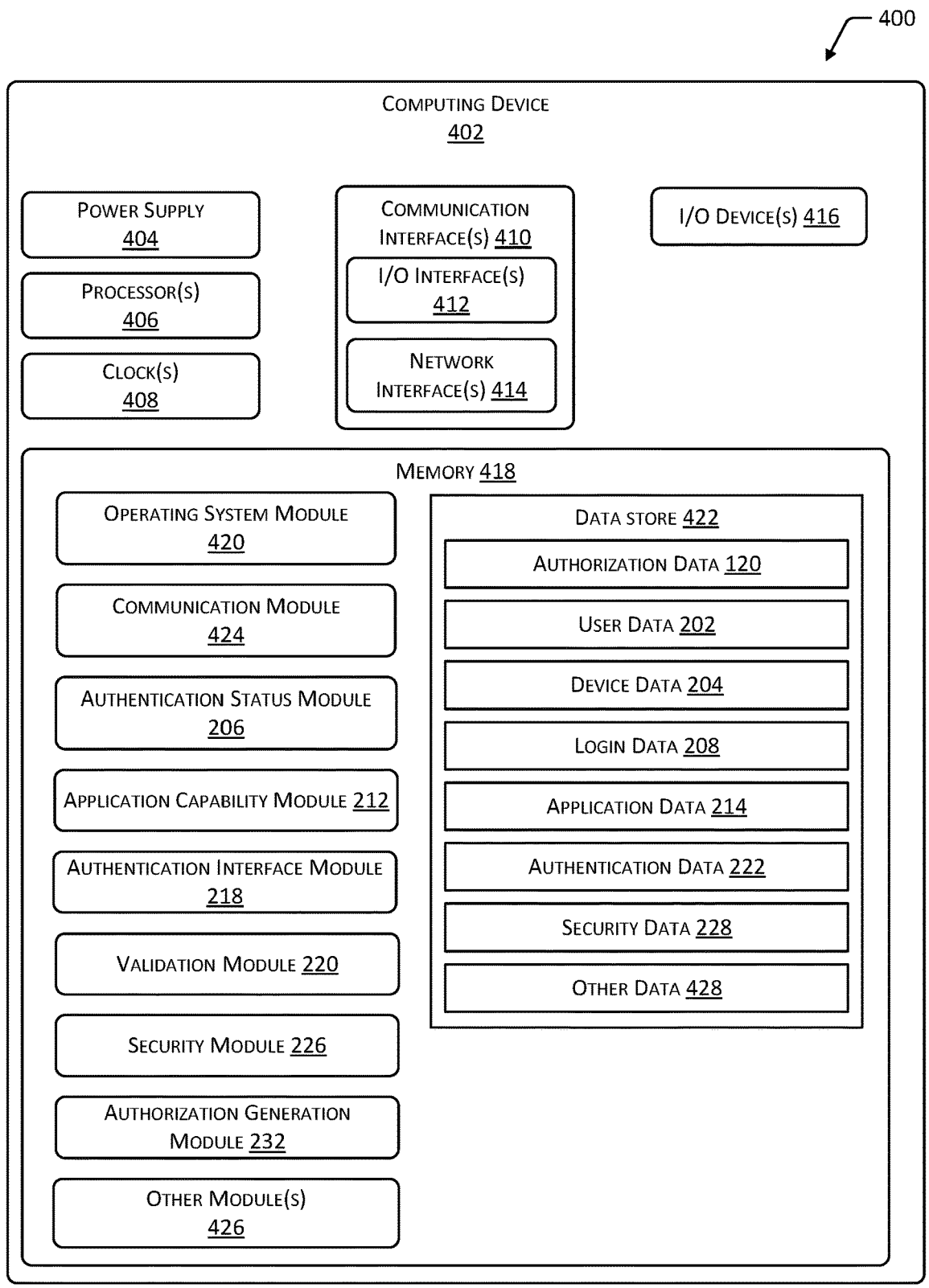
FIG. 4 is a block diagram illustrating an implementation of a computing device within the present disclosure.

FIG. 4 is a block diagram 400 illustrating an implementation of a computing device 402 within the present disclosure. The computing device 402 may include one or more transaction servers 118, webpage servers 108, user devices, or one or more other computing devices 402 in communication therewith. While FIG. 4 depicts a single block diagram 400 of a computing device 402, any number and any type of computing devices 402 may be used to perform the functions described herein. For example, FIGS. 1A-3 depict implementations of interactions between a user device 106, webpage server(s) 108, and transaction server(s) 118, in which each of the user device 106, webpage server(s) 108, and transaction server(s) 118 constitute separate computing devices 402 associated with different computing systems. However, in other implementations, a single computing device 402 or group of computing devices 402 may perform the functions associated with both the webpage server(s) 108 and the transaction server(s) 118.

One or more power supplies 404 may be configured to provide electrical power suitable for operating the components of the computing device 402. In some implementations, the power supply 404 may include a rechargeable battery, fuel cell, photovoltaic cell, power conditioning circuitry, and so forth.

The computing device 402 may include one or more hardware processor(s) 406 (processors) configured to execute one or more stored instructions. The processor(s) 406 may include one or more cores. One or more clock(s) 408 may provide information indicative of date, time, ticks, and so forth. For example, the processor(s) 406 may use data from the clock 408 to generate a timestamp, trigger a preprogrammed action, and so forth. The clock 408 may be used to determine time data 238 associated with authorization data 120, as described with regard to FIG. 2A.

The computing device 402 may include one or more communication interfaces 410, such as input/output (I/O) interfaces 412, network interfaces 414, and so forth. The communication interfaces 410 may enable the computing device 402, or components of the computing device 402, to communicate with other computing devices 402 or components of the other computing devices 402. The I/O interfaces 412 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 412 may couple to one or more I/O devices 416. The I/O devices 416 may include any manner of input devices or output devices associated with the computing device 402. For example, I/O devices 416 may include touch sensors, displays, touch sensors integrated with displays (e.g., touchscreen displays), keyboards, mouse devices, microphones, image sensors, cameras, scanners, speakers, haptic devices, printers, and so forth. In some implementations, the I/O devices 416 may be physically incorporated with the computing device 402. In other implementations, I/O devices 416 may be externally placed.

The network interfaces 414 may be configured to provide communications between the computing device 402 and other devices, such as the I/O devices 416, routers, access points, and so forth. The network interfaces 414 may include devices configured to couple to one or more networks including local area networks (LANs), wireless LANs (WLANs), wide area networks (WANs), wireless WANs, and so forth. For example, the network interfaces 414 may include devices compatible with Ethernet, Wi-Fi, Bluetooth, ZigBee, Z-Wave, 3G, 4G, 5G, LTE, and so forth.

The computing device 402 may include one or more busses or other internal communications hardware or software that allows for the transfer of data between the various modules and components of the computing device 402.

As shown in FIG. 4, the computing device 402 may include one or more memories 418. The memory 418 may include one or more computer-readable storage media (CRSM). The CRSM may be any one or more of an electronic storage medium, a magnetic storage medium, an optical storage medium, a quantum storage medium, a mechanical computer storage medium, and so forth. The memory 418 may provide storage of computer-readable instructions, data structures, program modules, and other data for the operation of the computing device 402. A few example modules are shown stored in the memory 418, although the same functionality may alternatively be implemented in hardware, firmware, or as a system on a chip (SoC).

The memory 418 may include one or more operating system (OS) modules 420. The OS module 420 may be configured to manage hardware resource devices such as the I/O interfaces 412, the network interfaces 414, the I/O devices 416, and to provide various services to applications or modules executing on the processors 406. The OS module 420 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

One or more data stores 422 and one or more of the following modules may also be associated with the memory 418. The modules may be executed as foreground applications, background tasks, daemons, and so forth. The data store(s) 422 may use a flat file, database, linked list, tree, executable code, script, or other data structure to store information. In some implementations, the data store(s) 422 or a portion of the data store(s) 422 may be distributed across one or more other devices including other computing devices 402, network attached storage devices, and so forth.

A communication module 424 may be configured to establish communications with one or more other computing devices 402. Communications may be authenticated, encrypted, and so forth.

The memory 418 may also store the authentication status module 206. The authentication status module 206 may determine whether a user 104, user account, user device 106, or other source of a request 116 has previously been authenticated or authorized to perform a transaction. In some implementations, the authentication status module 206 may determine correspondence between a source of the request 116, or data indicated in the request 116, with login data 208 indicative of users 104, accounts, or user devices 106 from which valid authentication information has previously been received. In some cases, received authentication information may remain valid for a threshold length of time, after which authentication information must again be received from the source of a request 116.

The memory 418 may additionally store the application capability module 212. The application capability module 212 may determine whether a browser application or other application associated with the source of a request 116 is capable of presenting pop-up windows or other types of interfaces. In some implementations, the application capability module 212 may determine whether an application is capable of presenting pop-up windows based on correspondence between the source of the request 116, or data indicated in the request 116, and application data 214 that may indicate applications that are capable or incapable of presenting pop-up windows. In other implementations, the application capability module 212 may determine the presence or absence of code or other instructions that may restrict or prevent presentation of pop-up windows. In still other implementations, the application capability module 212 may determine the redirection of an application to present an interface as a separate webpage 102(2), the absence of a JavaScript object or other instructions indicative of a presented pop-up window, or the absence of a context associated with continued access by an application to an initial webpage 102(1).

The memory 418 may further store the authentication interface module 218. The authentication interface module 218 may provide instructions to cause a computing device 402 to present an interface requesting authentication information. In some implementations, the instructions may cause the computing device 402 to present a pop-up window, however, if the computing device 402 is not capable of presenting a pop-up window, the interface may instead be presented as a redirection to a separate webpage 102(2). In other implementations, the authentication interface module 218 may provide instructions to cause a computing device 402 to present an interface as a redirection to a separate webpage 102(2) in response to a determination that an application associated with the computing device 402 is incapable of presenting the interface as a pop-up window.

The memory 418 may store the validation module 220, which may receive user input 114(2) to authenticate a user 104, user account, or computing device 402 and determine whether the received information validly authenticates the user 104, account, or computing device 402. The validation module 220 may determine correspondence between received user input 114(2) and authentication data 222 indicative of valid authentication information, such as valid user names and passwords.

The memory 418 may additionally store the security module 226. The security module 226 may determine and store a URI or other webpage information for a webpage 102(1) when a request 116(1) is received or when instructions to cause presentation of an interface requesting authentication information are provided to a computing device 402. When authorization data 120 is generated, the security module 226 may determine correspondence between the URI or other webpage information and security data 228 that indicates URIs or other destinations that are permitted to receive the authorization data 120.

The memory 418 may also store the authorization generation module 232. The authorization generation module 232 may generate authorization data 120, such as a token or other indication that one or more transactions are authorized, in response to receipt of valid authentication information by the validation module 220 and an indication of a valid security determination 230 by the security module 226. As described with regard to FIG. 2A, the authorization data 120 may include an indication of one or more users 104, accounts, or computing devices 402 that are authorized to perform the transaction(s), an indication of particular transactions that are authorized, an indication of particular webpages 102 or websites for which transactions are authorized, and so forth. In some implementations, the authorization data 120 may include time data 238 indicative of a time at which the authorization data 120 expires and is no longer usable to authorize a transaction.

Other modules 426 may also be present in the memory 418. For example, other modules 426 may include modules for generating webpages 102 or other interfaces based on webpage data indicative of images, text, controls 112, and so forth. Other modules 426 may include modules for determining characteristics of a computing device 402, such as a computing device 402 providing a request 116. Characteristics may include hardware or software components of a computing device 402, such as applications executed by the computing device 402, a location of the computing device 402, networks accessible to the computing device 402, and so forth. Other modules 426 may also include encryption modules to encrypt and decrypt communications between computing devices 402, authentication modules to authenticate communications sent or received by computing devices 402, administrative modules to assign, determine, and manage user permissions to access or modify data associated with computing devices 402, such as security data 228, and so forth.

Other data 428 within the data store(s) 422 may include configurations, settings, preferences, and default values associated with computing devices 402. Other data 428 may also include encryption keys and schema, access credentials, and so forth. Other data 428 may include webpage data and other user interface data for generation of webpages 102 and other user interfaces to present information and receive user input 114.

In different implementations, different computing devices 402 may have different capabilities or capacities. For example, transaction servers 118 may have greater processing capabilities or data storage capacity than user devices 106.

One example implementation for attempting to provide an authorization response to a user device 106 via JavaScript is described below in Code Example 1, © 2020 Amazon Technologies, Inc.

Code Example 1

```
var invokePostMesssage=function( ) {
  if (postMessageInvoked)
  return;
  var formattedMessage=generateAuthResponseMessage ("access_token":"AtzaIIwEIOUFX1MX40t)
  if (window.opener || window parent) {
    (window.opener || window.parent).postMessage(formattedMessage, "https://www.example.com/checkout/cart/");
  }
  postMessageInvoked=true;
};
```

```
var.invokeIframe=function ( ) {
  var p=(window.opener || window.parent).frames["iframe-
name"]';
  if (!p) {
  throw new Error ('xdc error: no proxy'+"iframe-name");
  }
  p._toucanInvokeTopic("https://www.example.com/
checkout/cart/",    "Y7FshFbSRUA",    {"access_token":
"Atza|IwEBIOUFX1MXO4ot}
  window.close( );
  var    closeMessage=document.getElementById('main-
Slot');
  if (closeMessage !=null {
  closeMessage.style.display="block";
  }
}
var delayMetricsScheduled=false;
var retriable=function(executable, errorHandling) {
  try {
  executable ( );
  } catch (err) {
  if (typeof errorHandling==='function') {errorHandling
  (err);}
  if (!delayMetricsScheduled) {
    setTimeout(function( ) {
      sendMetrics ("Access_Token_Send-Failed_FR");
      delayMetricsScheduled=true;
    }, 5000);
    delayMetricsScheduled=true;
  }
  if (i++<30) {
    setTimeout (function( ) {
      retriable(executable);
    }, 500);
  } else {
    Throw(err);
  }
  }
};
  if (!window.opener) {
    sendMetrics("XDC_Page_No_Opener");
  }
  retriable(invokeIframe, function(err) {
  try {
    invokePostMessage( );
  } catch (err) {
    console.log('xdc.error:'+err);
  }
  });
```

In cases where a browser application or other type of application is indicated as unsuitable for presentation of a pop-up window or iframe, an example implementation for redirecting the application to a URI that includes authorization data 120 is described below in Code Example 2, © 2020 Amazon Technologies, Inc.

Code Example 2

```
  var generaetReturnToUrl=function ( ) {
  var    merchantOriginUrl="https://www.example.com/
    checkout/cart/?apar=auth_response";
  if (merchantOriginURL) {
    var
      formattedMessage=generateAuthResponseMessage
      (raccess_token":"Atza|IwEBIK_y30iOJYI8})
    return    merchantOriginUrl.replace('auth_response;
      encodeURIComponent(formattedMessage));
  }
  return null;
  }
  send Metrics("XDC_Page_Cotninue_Rendered");
  returnToUrl=generateReturnToUrl( )
    if (returnToUrl) {
      sendMetrics("XDC_Page_Continue_Clicked");
      location.href=returnToUrl;
    }
  })( );
```

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A system comprising:
one or more memories storing computer-executable instructions; and
one or more hardware processors to execute the computer-executable instructions to:
provide instructions to a first computing device associated with a first webpage, wherein the instructions cause the first computing device to:
determine input associated with a user interface control presented on the first webpage, wherein the first webpage is associated with a first Uniform Resource Identifier (URI);
in response to the input, determine a user account associated with the input and a browser application associated with the user account;
determine correspondence between the browser application and application data that indicates browser applications that are not configured to present pop-up windows;
based on the correspondence indicating that the browser application is not configured to present a pop-up window, cause redirection of the browser application to a second webpage, wherein the second webpage requests first data to authenticate access to payment data associated with the user account; and
provide, to a second computing device, a first request to access the payment data associated with the user account, wherein the first request indicates the first URI;
based on the first request, store the first URI;
receive the first data;
in response to the first data, determine that the first URI matches a URI included in security data, wherein the security data indicates URIs associated with websites authorized to access the payment data; and
based on the first URI matching the URI included in the security data, provide, to a third computing device associated with the browser application, a second URI, wherein the second URI includes the first URI and authorization data indicating receipt of valid authentication information, and wherein the second URI causes presentation of the first webpage having one or more features associated with the payment data based on the authorization data included in the second URI.

2. A method comprising:
providing instructions to a first computing device to cause the first computing device to:
receive, from a second computing device, a first request to perform a first transaction associated with a first interface;
determine that the first transaction is associated with a second interface for requesting first data associated with the first transaction, wherein the second interface is presented by one or more of: redirecting a first application accessing the first interface to the second interface or accessing a second application to present the second interface; and
provide, to the second computing device, an instruction to cause presentation of a pop-up window, wherein the instruction causes the second computing device to one or more of: redirect the first application from the first interface to the second interface or access the second application to cause presentation of the second interface;
receiving the first data associated with the first transaction from the second computing device via the second interface;
in response to receipt of the first data via the second interface, generating second data that includes: information for accessing the first interface and an indication of authorization to perform the first transaction; and
providing the second data to the second computing device to cause presentation, on the first interface, of at least one feature associated with the first transaction based on the indication of authorization.

3. The method of claim 2, further comprising:
determining one or more of a failure or an inability to present the pop-up window by the first application by:
determining the first application is associated with a computing device accessing the first interface; and
determining correspondence between the first application and application data that indicates one or more of: applications associated with the inability to present the pop-up window or applications associated with an ability to present the pop-up window;
wherein the second data is provided to the second computing device based at least in part on the correspondence between the first application and the application data.

4. The method of claim 2, further comprising:
determining an absence of a JavaScript object indicative of the pop-up window that is associated with the second computing device;
wherein the second data is provided to the second computing device based at least in part on the absence of the JavaScript object indicative of the pop-up window.

5. The method of claim 2, further comprising:
determining an inability to exchange data, via the first application, with the first computing device associated with the first interface;
wherein the second data is provided to the second computing device based at least in part on the inability to exchange data with the first computing device via the first application.

6. The method of claim 2, further comprising:
determining one or more of a failure or an inability of the first application to present the pop-up window by determining instructions associated with an application accessing the first interface, wherein the instructions are configured to prevent presentation of pop-up windows, and wherein the second data is provided to the second computing device based at least in part on the determining of the instructions configured to prevent presentation of pop-up windows.

7. The method of claim 2, further comprising:
determining correspondence between the information for accessing the first interface and security data indicative of websites authorized to receive the second data;

wherein the second data is generated in response to the correspondence between the information and the security data.

8. The method of claim 2, wherein the information for accessing the first interface includes a Uniform Resource Identifier (URI), and wherein the second data is included in the URI.

9. The method of claim 2, further comprising:
determining the first request associated with the second data; and
causing performance of at least a portion of the first transaction based on the first request and the second data.

10. The method of claim 2, wherein the second data includes one or more of:
a first identifier indicative of a website associated with the first interface;
an indication of an expiration time;
a second identifier indicative of one or more of a user device or a user account; or
an indication of one or more authorized transactions that include the first transaction.

11. The method of claim 2, wherein the second data includes an indication of an expiration time and an indication of one or more authorized transactions, the method further comprising:
receiving a second request to perform one or more of the first transaction or a second transaction;
determining that the one or more of the first transaction or the second transaction is included in the indication of the one or more authorized transactions of the second data;
determining a lack of occurrence of the expiration time indicated in the second data; and
performing at least a portion of the one or more of the first transaction or the second transaction based on the second data.

12. A system comprising:
one or more memories storing computer-executable instructions; and
one or more hardware processors associated with a first computing device, the one or more hardware processors to execute the computer-executable instructions to:
provide instructions to a second computing device to cause the second computing device to:
receive a first request to perform a first transaction associated with a first webpage;
provide an instruction to a third computing device accessing the first webpage to cause presentation of a pop-up window by the third computing device, wherein the instruction causes redirection of the third computing device from the first webpage to present a second webpage; and
determine one or more of: redirection of the third computing device from the first webpage to present the second webpage or a failure to present the pop-up window;
in response to the one or more of the redirection or the failure to present the pop-up window, determine first data for accessing the first webpage;
receive, from the third computing device via the second webpage, second data indicative of input provided to the second webpage; and
in response to receiving the second data via the second webpage and based on the first data and the second data, provide, to the second computing device, third data indicating authorization to perform the first transaction.

13. The system of claim 12, wherein the instructions to determine the one or more of the presentation of the second webpage or the failure to present the pop-up window include instructions to:
determine an absence of instructions indicative of the pop-up window, wherein the failure to present the pop-up window is determined based on the absence of the instructions indicative of the pop-up window.

14. The system of claim 12, wherein the instructions to determine one or more of the presentation of the second webpage or the failure to present the pop-up window include instructions to:
determine a lack of access, by an application of the first computing device, to the first webpage after providing the instruction to the third computing device.

15. The system of claim 12, further comprising computer-executable instructions to:
determine correspondence between the first data for accessing the first webpage and fourth data indicative of websites authorized to receive the second data;
wherein the second data is provided to the second computing device in response to the correspondence.

16. The system of claim 15, further comprising computer-executable instructions to:
receive at least a portion of the fourth data from the first computing device, wherein the fourth data includes a list of Uniform Resource Identifiers (URIs) associated with a plurality of webpages that include the first webpage.

17. The system of claim 12, wherein the first data includes a Uniform Resource Identifier (URI) associated with the first webpage and the second data includes a token within the URI.

18. The system of claim 17, wherein the third data includes an indication of an expiration time, the system further comprising computer-executable instructions to:
receive a second request to perform the first transaction prior to the expiration time; and
based on the third data, perform at least a portion of the first transaction.

19. The system of claim 17, wherein the third data includes an indication of one or more authorized transactions that include the first transaction, the system further comprising computer-executable instructions to:
receive a second request to perform one or more of the first transaction or a second transaction included in the one or more authorized transactions; and
based on the third data, perform at least a portion of the one or more of the first transaction or the second transaction.

20. The system of claim 12, further comprising computer-executable instructions to:
cause the third computing device to present the first webpage; and
provide a second request to the second computing device to perform the first transaction, wherein in response to the second request and the third data, the first webpage is presented with at least one feature associated with performance of the first transaction.

* * * * *